(12) United States Patent
Franz et al.

(10) Patent No.: US 11,446,790 B2
(45) Date of Patent: Sep. 20, 2022

(54) GRIPPING OR CLAMPING DEVICE COMPRISING A SLIDING GUIDE AND ROLLER GUIDE BETWEEN JAW GUIDE SURFACES AND A HOUSING

(71) Applicant: SCHUNK GmbH & Co KG Spann-und Greiftechnik, Lauffen am Neckar (DE)

(72) Inventors: Michael Franz, Ilsfeld (DE); Klaus Bonnet, Nordheim (DE); Tobias Schleusener, Eppingen (DE); Julian Heinzl, Brackenheim (DE); Benjamin Kirsten, Brackenheim (DE); Bruno Fellhauer, Brackenheim (DE); Ralf Winkler, Nordheim (DE)

(73) Assignee: SCHUNK GmbH & Co KG Spann-und Greiftec, Lauffen am Neckar (DE)

( * ) Notice: Subject to any disclaimer, the term of this patent is extended or adjusted under 35 U.S.C. 154(b) by 0 days.

(21) Appl. No.: 16/975,326

(22) PCT Filed: Feb. 19, 2020

(86) PCT No.: PCT/EP2020/054373
§ 371 (c)(1),
(2) Date: Aug. 24, 2020

(87) PCT Pub. No.: WO2020/169675
PCT Pub. Date: Aug. 27, 2020

(65) Prior Publication Data
US 2021/0370477 A1 Dec. 2, 2021

(30) Foreign Application Priority Data
Feb. 21, 2019 (DE) ...................... 10 2019 104 484.7

(51) Int. Cl.
*B25B 5/00* (2006.01)
*B25B 5/02* (2006.01)
(Continued)

(52) U.S. Cl.
CPC .............. *B25B 5/02* (2013.01); *F16C 29/002* (2013.01); *F16C 29/005* (2013.01);
(Continued)

(58) Field of Classification Search
CPC .... B25B 5/00; B25B 1/00; B25B 5/02; B25B 5/102; B25J 15/028; B25J 15/0253
See application file for complete search history.

(56) References Cited

U.S. PATENT DOCUMENTS 4,707,013 A  11/1987  Vranish et al.
4,874,194 A  10/1989  Borcea et al.
(Continued)

FOREIGN PATENT DOCUMENTS

CH  663373 A5  12/1987
DE  3921055 A1  4/1990
(Continued)

OTHER PUBLICATIONS

Innovation durch Kombination: Wäiz-Gleit Lagerung für Servopressen, Oct. 7, 2016, pp. 1-6.
(Continued)

*Primary Examiner* — Lee D Wilson
(74) *Attorney, Agent, or Firm* — George McGuire (57) ABSTRACT

A gripping or clamping device including a housing body and at least one jaw guide which is provided in the housing body and has two lateral walls, including at least one jaw which can be moved in the jaw guide along a movement direction, guide surfaces being provided on the lateral walls and the jaw having sliding surfaces which interact with the guide surfaces to form a sliding guide, wherein at least one
(Continued)

raceway part and rolling elements are provided in the jaw guide, the jaw and the raceway part each having a raceway for abutting against the rolling elements to form a roller guide.

12 Claims, 7 Drawing Sheets (51) Int. Cl.
  *F16C 29/00* (2006.01)
  *F16C 29/04* (2006.01)
(52) U.S. Cl.
  CPC .......... *F16C 29/041* (2013.01); *F16C 29/043* (2013.01); *F16C 2322/50* (2013.01)

(56) References Cited

U.S. PATENT DOCUMENTS

| | | | |
|---|---|---|---|
| 5,306,090 A | 4/1994 | Niwa et al. | |
| 5,547,285 A | 8/1996 | Hutzel et al. | |
| 6,431,536 B1 * | 8/2002 | Maffeis | B23B 31/16279 |
| | | | 269/203 |
| 6,827,381 B1 * | 12/2004 | Reichert | B25J 15/028 |
| | | | 294/119.1 |
| 6,830,273 B2 * | 12/2004 | Michler | B25J 15/028 |
| | | | 294/207 |
| 8,152,214 B2 | 4/2012 | Williams et al. | |
| 2010/0027922 A1 | 2/2010 | Winkler et al. | |
| 2018/0085929 A1 * | 3/2018 | Zimmer | B25J 15/0253 |

FOREIGN PATENT DOCUMENTS

| | | |
|---|---|---|
| DE | 4327543 A1 | 3/1994 |
| DE | 202011106379 U1 | 11/2011 |
| DE | 102015205657 A1 | 9/2016 |
| DE | 102017102652 A1 | 8/2018 |
| EP | 1039987 A1 | 10/2000 |
| WO | 0025033 A1 | 5/2000 |

OTHER PUBLICATIONS

Meta Motoren- und Energie-Technik GmbH, Neuartige Lagerungstechnik des Kurbeltriebs von Verbrennungsmotoren zur Verbesserung der Effizienz und Minderung der Emissionen, gefördert unter dem AZ: 25518-24/0 von der Deutschen Bundesstiftung Umwelt, Herzogenrath, Jun. 2011. pp. 1-46.

International Search Report of PCT/EP2020/054373, dated Jun. 25, 2020.

German Exam Report of 10 2019 104 484.7, dated Jan. 22, 2020.

* cited by examiner

GRIPPING OR CLAMPING DEVICE COMPRISING A SLIDING GUIDE AND ROLLER GUIDE BETWEEN JAW GUIDE SURFACES AND A HOUSING

CROSS-REFERENCE TO RELATED APPLICATION

The present application is the United States National Phase application of PCT Application PCT/EP2020/054373 filed Feb. 19, 2020, which relates and claims priority to German Application No. DE 10 2019 104 484.7 filed Feb. 21, 2019, the entirety of each of which is incorporated herein by reference.

BACKGROUND OF THE INVENTION

The invention relates to a gripping or clamping device comprising a housing body and at least one jaw guide which is provided in the housing body and has two lateral walls, comprising at least one jaw which can be moved in the jaw guide along a movement direction, guide surfaces being provided on the lateral walls and the jaw having sliding surfaces which interact with the guide surfaces to form a sliding guide.

Gripping and clamping devices of this kind are known, for example, from DE 2017 102 652 A1 or DE 10 2015 205 657 A1.

In such gripping or clamping devices, it is necessary to guide the jaws in the jaw guides in a highly precise manner. In addition, a comparatively smooth guidance of the jaws in the jaw guides must be provided. In order to achieve said smooth guidance, the jaws, or the sliding surfaces thereof, and the guide surfaces of the jaw guide are ground. Grinding of this kind is comparatively complex and expensive.

A sliding guide between the jaws and the housing body has the disadvantage that what is referred to as a stick-slip effect occurs. The stick-slip effect causes bodies which are moved against one another to slide in a jerky manner. This effect occurs in particular when the static friction is significantly greater than the sliding friction. Therefore, in order to set the jaw in motion, a higher force is required than is required to maintain the sliding movement.

In order to guide moving components as smoothly as possible, roller guides are known from the prior art that provide rolling elements, such as balls, rollers or needles, which roll between the moving parts. U.S. Pat. No. 4,707, 013 A, DE 39 21 055 A1 and DE 20 2011 106 379 U1 thus show gripping and clamping devices comprising roller guides between the jaw and the lateral walls.

The advantage of roller guides is that they do not have a stick-slip effect, as occurs in sliding guides. Roller guides are unsuitable for gripping or clamping devices, however, because they are comparatively sensitive to impact and shock. If, for example, the jaw of a gripping or clamping device that is guided by a roller guide is subject to a shock or impact, the force acting on the jaw is transmitted to the rolling element. This can lead to damage to the rolling surface of the rolling body or to the counter surface thereof comparatively quickly, as a result of which a precise guidance of the jaw is then no longer ensured. In this respect, roller guides are generally not suitable for gripping or clamping devices that are exposed to impacts or shocks.

SUMMARY OF THE INVENTION

The problem addressed by the present invention is that of providing a gripping or clamping device mentioned at the outset that has a sliding guide for guiding the jaws, the stick-slip effect known in sliding guides being as low as possible and in particular being avoided.

This problem is solved by a gripping or clamping device having the features of claim 1. Such a gripping or clamping device in particular provides that at least one raceway part and rolling elements are provided in the jaw guide, the jaw and the raceway part each having a raceway for abutment against the rolling elements to form a roller guide. Pretensioning means are also provided for generating a pretensioning force, the pretensioning force acting on the raceway part so that the rolling elements are pressed against the jaw-side raceways. The raceway part in this case preferably extends in the movement direction and is provided laterally next to the jaw, i.e. between the jaw and the lateral walls.

A design of this kind has the advantage that, in addition to the sliding guide, a roller guide is provided, the rolling elements of which are provided between the housing body and the jaw by means of the pretensioning means, i.e. with zero clearance. As a result, a stick-slip effect can be reduced or avoided when starting or moving the jaw, and a gripping or clamping device of this kind can therefore be operated comparatively smoothly. If overloads, impacts or shocks occur, they can be diverted into the housing body via the sliding guide without causing damage to the rolling elements.

As a result of the provision of the pretensioning means, the roller guide can be zero clearance and does not have to be ground or paired, which reduces manufacturing and assembly costs.

The sliding guide is advantageously designed as a sliding guide with clearance. The sliding guide then has a clearance between the guide surfaces and the sliding surfaces, so that the guide surfaces only act against the sliding surfaces if a force which is counter to the direction of the pretensioning force and counteracts or exceeds the pretensioning force acts on the jaw. If the pretensioning force, by means of which the rolling elements act against the jaw-side raceways, is consequently interrupted due to a force resulting, for example, from an overload, an impact or a shock, the sliding guide comes into effect; forces occurring in the gripping or clamping device can be diverted into the housing body via the sliding guide without damaging the rolling elements.

A gripping or clamping device of this kind consequently has a switchover point at which, in particular depending on the pretensioning force and the sliding guide clearance, the roller guide is relieved and the sliding guide comes into effect. The switchover point can be selected such that it only occurs in the event of an overload, in order to protect the roller guide from overload, impacts or shocks. This results in a roller guide having improved properties, which is protected by a sliding guide in the event of an overload. Since, in this case, the resulting guide clearance is the clearance of the roller guide, the sliding guides can be produced so as to have a comparatively large amount of clearance, and therefore cost-effectively. The greater clearance of the sliding guides only comes into effect after the switchover point at which there is a switch from the roller guide to the sliding guides, and then only occurs when there is an overload.

However, it is also conceivable that the pretensioning force, and thus the switchover point, is selected such that the roller guide comes into effect when the gripping or clamping device is only subject to a low load, and that the sliding guide comes into effect when the gripping or clamping device is operated in nominal operation. In this case, due to the roller guide, only a small driving force is required for starting and moving the jaws. In a process under load or in the gripping state, a large part of the force acting on the gripping device is dissipated via the more robust and resilient sliding guide.

In order to be able to absorb and dissipate forces, which in particular act transversely to the movement direction, it is advantageous if two raceway parts are provided, one raceway part being provided between the jaw and one lateral wall, and the other raceway part being provided between the jaw and the other lateral wall in each case. The raceway parts are preferably arranged symmetrically with respect to one another and/or with respect to a central plane which extends in the movement direction. The central plane extends in the movement direction and is located centrally between the lateral walls.

In this case, the raceway parts can preferably have raceways extending in parallel with one another. Forces can be diverted symmetrically into the housing body as a result.

It is also advantageous if the relevant raceway part has two raceways including an angle and if the relevant jaw has correspondingly extending sliding surfaces. In this case, the raceways can in particular include an angle of between 60° and 120°, preferably in the range of 90°. It is also conceivable that the raceways include an angle of between 300° and 240°, in particular in the range of 270°. The rolling elements can preferably be trapped in a rolling element cage, the rolling element cage being designed such that it holds the rolling elements in accordance with the angle that the raceways include. By providing such an angle, forces acting on the gripping or tensioning device can be reliably deflected and diverted.

In order to provide reliable guidance of the jaw in the jaw guide, it is advantageous if the lateral walls of the jaw guide each have a plurality of guide surfaces, the planes in which adjacent guide surfaces are located including an acute angle. As a result, forces which in particular act on the jaw along the central plane, but not in the movement direction, can be favorably diverted into the housing body.

A further advantageous embodiment is obtained if the jaw has at least two sliding surfaces which interact with a lateral wall, and if at least one jaw-side raceway is arranged between these two sliding surfaces. In particular the raceway and the rolling elements interacting with the raceway can be protected from damage as a result, since the raceway is between the sliding surfaces of the sliding guide.

The pretensioning means can preferably be integral with the raceway part or the housing body. In this case, the pretensioning means can in particular be provided by means of material recesses on the conveyor belt part and/or on the housing body. The material recesses are arranged such that the raceway part or the housing body provides the pretensioning force in an elastically compliant manner.

According to the invention, however, it is also conceivable that the pretensioning means are designed as spring elements provided between the housing body and the raceway part. Pretensioning means of this kind are then provided separately from the raceway part and from the housing body. Said pretensioning means can be designed in particular as coil springs, leaf springs, disc springs or elastomer springs.

It has also proven to be advantageous to provide adjusting means for adjusting the pretensioning force of the pretensioning means. In particular if the pretensioning means are designed as spring elements having an error characteristic which is in particular linear or progressive, it is conceivable to adjust the pretensioning force accordingly by compressing the spring element to different degrees. Possible adjusting means are, for example, screws or bolts which act against the relevant pretensioning means, such that the pretensioning force of the pretensioning means or the spring force of the spring means is adjusted. This allows the position of the switchover point to be changed and adapted to the relevant use.

Another embodiment having two sliding guides would also be conceivable. The first guide would be a guide having a comparatively large amount of clearance and a high load capacity and having a pairing such as steel-steel or steel-aluminum or aluminum-aluminum. The second guide would be, for example, a guide having comparatively little clearance, or a zero-clearance guide, the second guide having a lower load capacity but better sliding properties than the first guide. The second guide can have a pairing of steel-plastic or aluminum-plastic or steel-bronze, for example.

It is also advantageous if the rolling elements are trapped in a cage, the cage being provided between the guide surface and the sliding surface. It is particularly advantageous if the cage has sliding portions which interact with the jaw-side and raceway part-side raceways. The sliding guide can then be formed by the raceways and the sliding portions of the cage that are between said raceways. The raceways therefore act indirectly against each other by means of the interposed cage.

Balls, barrels, rollers or needles are particularly suitable as rolling elements. It has also been found to be particularly advantageous to use hollow rollers, since these can be compliant and resilient, so that a permanent deformation of the rolling elements in the event of shocks or impacts can be avoided.

Further details and advantageous designs of the invention can be found in the following description, on the basis of which embodiments of the invention are described and explained in more detail.

DETAILED DESCRIPTION

Figure 1:
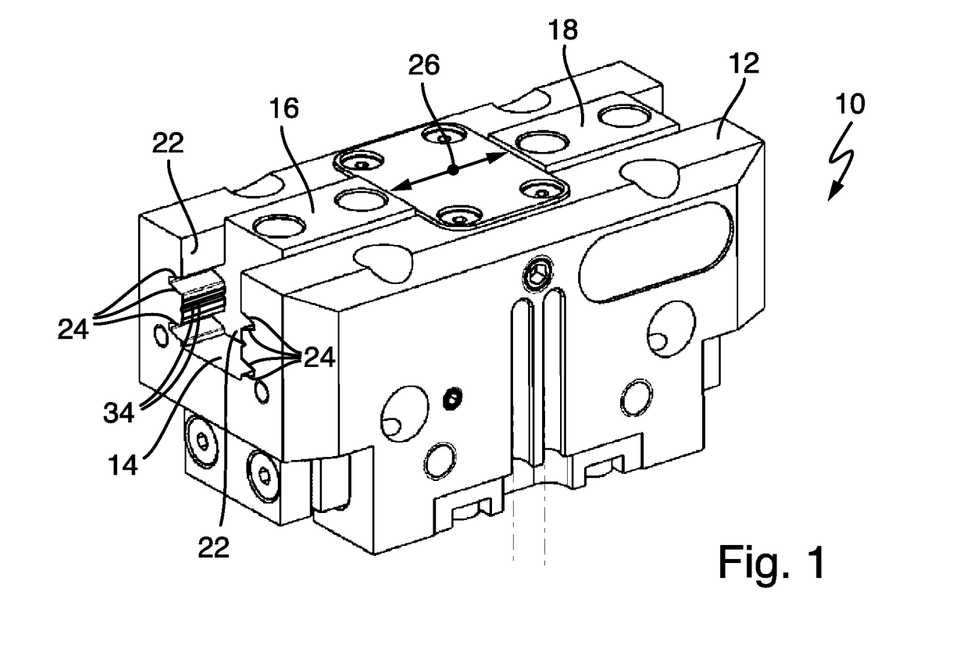
FIG. 1 is an isometric view of a gripping device according to the invention.

The gripping device 10 shown in FIG. 1 comprises a housing body 12 having a jaw guide 14 extending through the housing body 12 in the longitudinal direction. Two displaceably mounted jaws 16, 18 are provided in the jaw guide 14, which can be moved towards and away from one another along the movement direction 26, which is indicated by a double arrow.

Figure 2:
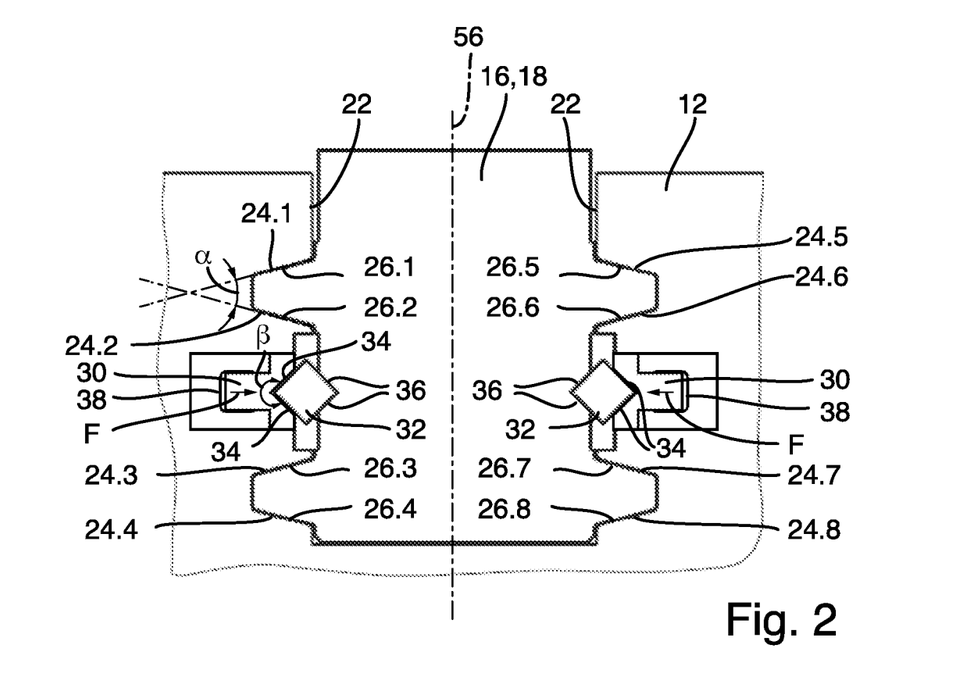
FIG. 2 shows a cross section of the gripping device according to FIG. 1.

As is also clear from the cross section according to FIG. 2, the jaw guide 14 has two mutually opposite lateral walls 22, on which guide surfaces 24 are provided. The jaws 16, 18 have sliding surfaces 26 which interact with the guide surfaces 24 to form a sliding guide.

In the embodiment according to FIGS. 1 and 2, a total of eight guide surfaces 24.1 to 24.8 are provided which interact with eight sliding surfaces 26.1 to 26.8 to form a sliding guide. The respectively adjacent guide surfaces 24.1 and 24.2; 24.3 and 24.4; 24.5 and 24.6; and 24.7 and 24.8 each include an acute angle $\alpha$. Correspondingly, the associated jaw-side sliding surfaces 26.1 to 26.8 each include a corresponding acute angle $\alpha$, which is in particular in the range of from 20° to 40°, and further in the range of from 28° to 32° and preferably in the range of 30°.

Overall, the lateral walls 22 and the portions of the jaws 16, 18 which interact with the lateral walls 22 are formed symmetrically with respect to a central plane 56 which extends in the movement direction 26 and lies between the side walls.

In the jaw guide 14, on the lateral walls 22, two raceway parts 30 arranged opposite each other are provided. Rolling elements 32, for example in the form of barrels or rollers, are provided between the raceway parts 30 and the relevant jaw 16, 18. The arrangement of the rolling elements 32 can in this case correspond to the arrangement in a crossed roller bearing. The raceway parts 30 provide raceways 34 for abutting the rolling elements 32. Likewise, the jaws 16, 18 provide jaw-side raceways 36 for abutting the rolling elements 32. The raceways 34 provided on a raceway part 30 each include an obtuse angle $\beta$ which is in the range of 270°. In addition to the sliding guide formed by the guide surfaces 24 and sliding surfaces 26, a roller guide of the jaws 16, 18 is provided due to the provision of the rolling elements 32.

Between the housing body 12 and the raceway parts 30, pretensioning means 38 are provided for generating pretensioning forces F which press the raceway parts 30 toward the jaw 16, 18, so that the rolling elements 32 are pressed against the jaw-side raceways 36. Because the pretensioning forces F are of equal magnitude in the idle state, the relevant jaw 16, 18 is held largely centrally in the jaw guide 14. In FIG. 2, the pretensioning means 38 are designed as elastomer spring blocks; helical springs, coil springs or other spring elements can also be used instead of these elastomer spring blocks.

The sliding guide is preferably designed as a sliding guide which has clearance, which guide has clearance between the guide surfaces 24 and the sliding surfaces 26. In this case, the clearance is such that the guide surfaces 24 act against the sliding surfaces 26 when a force which acts transversely to the movement direction, counter to the relevant pretensioning force F, and counteracts or exceeds the relevant pretensioning force F acts on the relevant jaw 16, 18.

An external force of this kind can result in particular from an overload, an impact or a shock. The clearance of the sliding guide is chosen such that when external forces of this kind occur, the sliding guides come into effect before the rolling elements 32 or the raceways 34, 36 can be damaged. The roller guide is consequently protected from overload by sliding guides which come into use.

Due to the provision of the spring means and the provided pretensioning forces, the roller guide is designed to be zero clearance. This results in the jaws 16, 18 being set into motion in a very low-friction manner, and therefore easily; a slip-stick effect, as occurs in the case of simple sliding guides, is reduced and preferably prevented. If greater loads or forces act on the jaw 16, 18, the resulting force can be diverted into the housing body 12 via the sliding guide without causing damage to the roller guide.

In the embodiment shown in FIG. 2, the relevant pretensioning element 38 and the relevant pretensioning force F resulting therefrom are relatively small. It is thereby achieved that a movement of the jaws 16, 18 takes place via the roller guide without an external force acting on the jaws 16, 18. Because of the low pretensioning forces, the sliding guide comes into effect as soon as external forces act on the jaws 16, 18. It is advantageous that no stick-slip effect occurs when the jaws 16, 18 are started.

Figure 3:
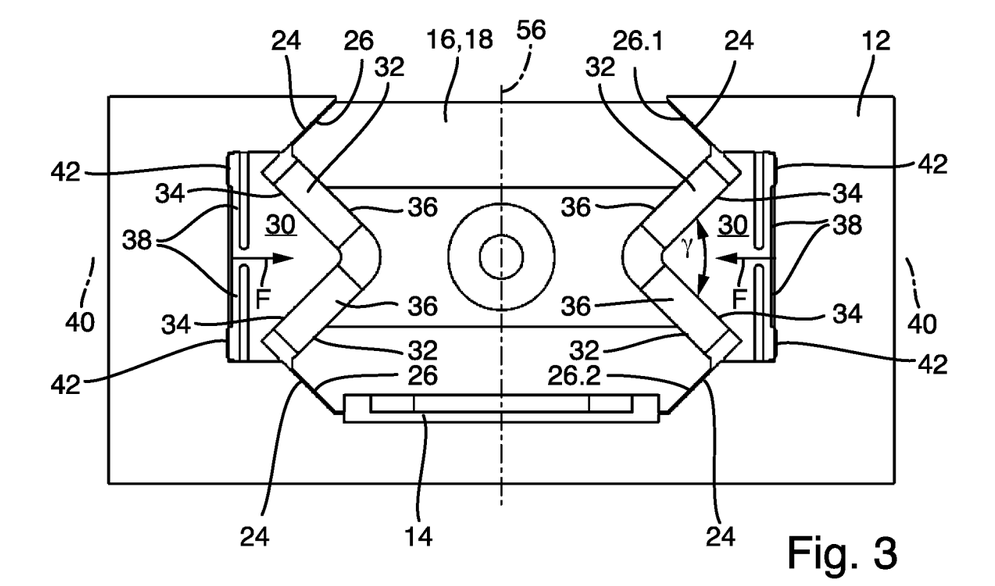
FIG. 3 shows a cross section of an additional gripping device according to the invention.

In the embodiment according to FIG. 3, as in the embodiment according to FIG. 2, a sliding guide and a roller guide are provided. Components corresponding to FIG. 2 have corresponding reference signs.

In contrast to FIG. 2, in the embodiment according to FIG. 3 the raceways 34 each include an acute angle $\gamma$ in the range of preferably 90° on the raceway part 30. Providing an angle $\gamma$ of 90° results in similar conditions in the direction extending transverse to the movement direction, due to the asymmetrical conditions. If the angle $\gamma$ is less than 90°, this results in better properties in the z-direction, i.e. in FIG. 2 in the upward direction. If the angle $\gamma$ is more than 90°, this results in better properties in the $\gamma$-direction, i.e. in the direction of the right-hand or left-hand side in FIG. 2. The rolling elements 32 are provided between the relevant raceway 34 and the jaw-side raceway 36 which corresponds thereto. In total, two rows of rolling elements 32 interact with each raceway part 30. According to the embodiment according to FIG. 2, in the embodiment according to FIG. 3, the jaw-side raceways 36 are arranged between jaw-side sliding surfaces 26.

In the embodiment according to FIG. 3, the sliding surfaces 26 and the raceways 36 form a zigzag line in the section plane shown in FIG. 3, which line extends symmetrically with respect to a central longitudinal plane, which is identified in FIG. 3 by reference sign 40. The sliding surface 26.1 in this case includes a 90° angle together with the raceway 36 adjoining said sliding surface. The two raceways 36 in turn include an angle of 90°, and the lower raceway 36 likewise includes an angle of 90° together with the sliding surface 26.2 adjoining said lower raceway, as is clear from FIG. 3.

In the embodiment according to FIG. 3, the pretensioning means 38 are designed as spring tongues which are integral with the raceway part 30. The spring-tongue-like pretensioning means 38 have free ends 42 which, in order to provide the pretensioning forces F, act against the housing body 12 in an elastically compliant manner.

Also in the embodiment according to FIG. 3, the sliding guide produced by the guide surfaces 24 and sliding surfaces 26 is a sliding guide which has clearance and is designed such that the guide surfaces 24 act against the sliding surfaces 26 when a force which exceeds the relevant pretensioning force F acts on the jaw 16, 18.

In the embodiment according to FIG. 3, by comparison with the embodiment according to FIG. 2, significantly greater pretensioning forces F are provided. As a result, the sliding guide forms an overload protection. During normal operation of the gripping device 10, the roller guide, which has comparatively large dimensions, comes into effect. The resulting forces are only absorbed by the sliding guide in the event of overload, impacts or shocks, when the external forces acting on the jaw counteract or exceed the relevant pretensioning force F. This has the advantage that the shock-sensitive roller guide is protected in the critical region by the sliding guide.

Figure 4:
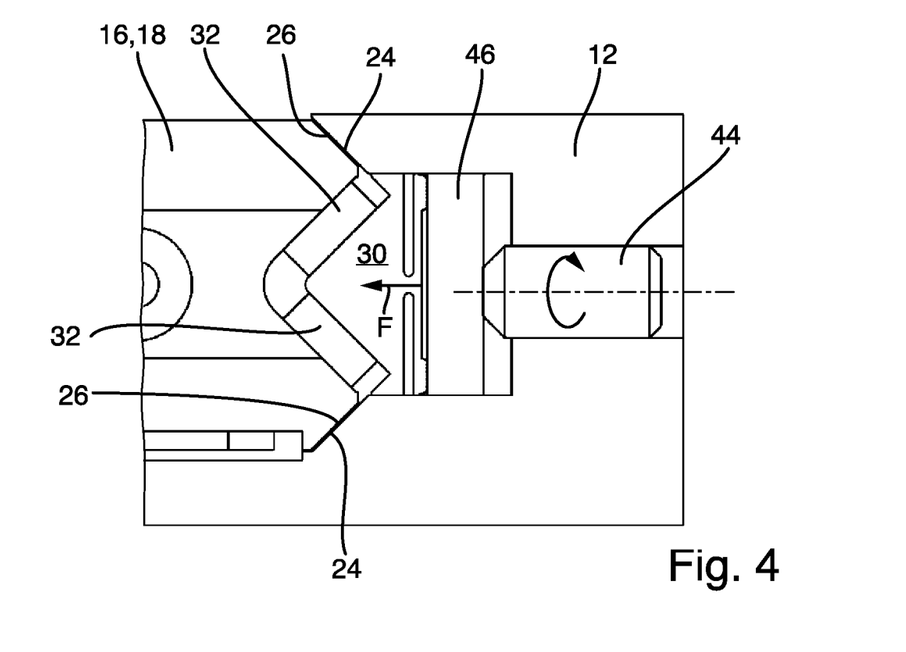
FIG. 4 shows a detail of the device according to FIG. 3 with an adjusting means.

A development of the embodiment according to FIG. 3 is shown in FIG. 4. In the embodiment according to FIG. 4, adjusting means 44 are additionally provided in the form of threaded bolts which are screwed into the main body 12 to different degrees. By means of the relevant adjusting means 44, the pretensioning force F acting on the relevant raceway part 30, which is provided by the relevant pretensioning element 38, can be adjusted. For better introduction of force, a pressure plate 46 is provided between the adjusting means 44 and the raceway part 30. The embodiment according to FIG. 4 therefore has the advantage that the pretensioning force F can be actively changed, as a result of which the switchover point between the roller guide and the sliding guide can also be changed and adapted to different uses.

Figure 5:
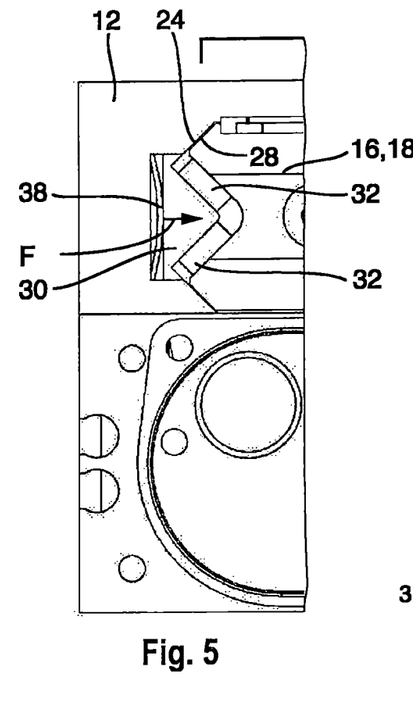
FIG. 5 shows a partial cross section of an additional gripping device according to the invention.
Figure 6:
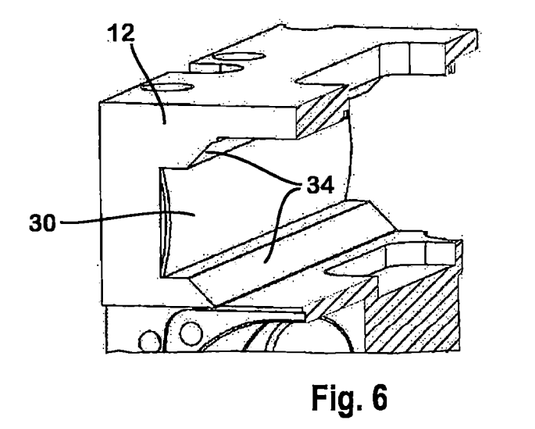
FIG. 6 is an isometric view of a detail of FIG. 5 without a jaw and without a raceway part.
Figure 7:
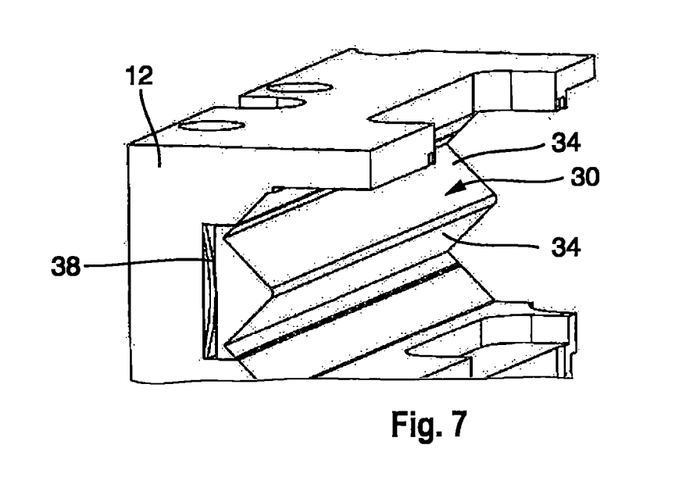
FIG. 7 is the view according to FIG. 6 with a raceway part.

The embodiment shown in FIGS. 5 to 7 substantially corresponds to the embodiment according to FIG. 3, a pretensioning means 38 being provided separately from the raceway part 30 in this case. As is clear from the isometric view according to FIG. 6, the pretensioning means 38 is designed as a pretensioned leaf spring 38, which acts against the housing body 12 on one side and against the relevant raceway part 30 on the other side.

Figure 8:
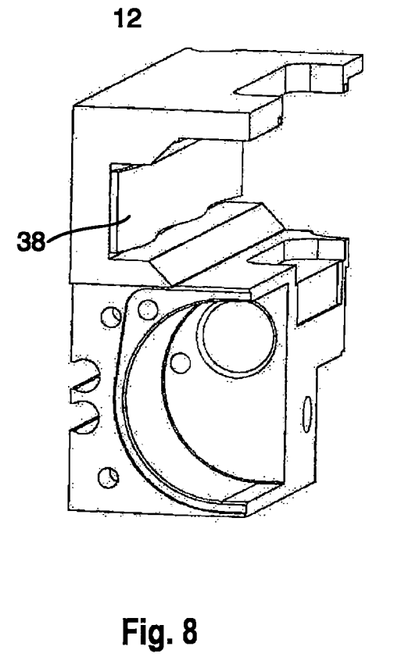
FIG. 8 is a view corresponding to FIG. 6 with a differently designed pretensioning means.
Figure 9:
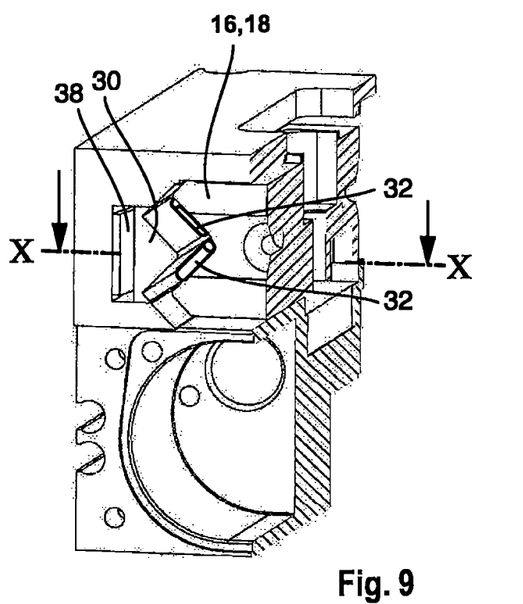
FIG. 9 is the view according to FIG. 8 with a raceway part, rolling elements and a jaw.
Figure 10:
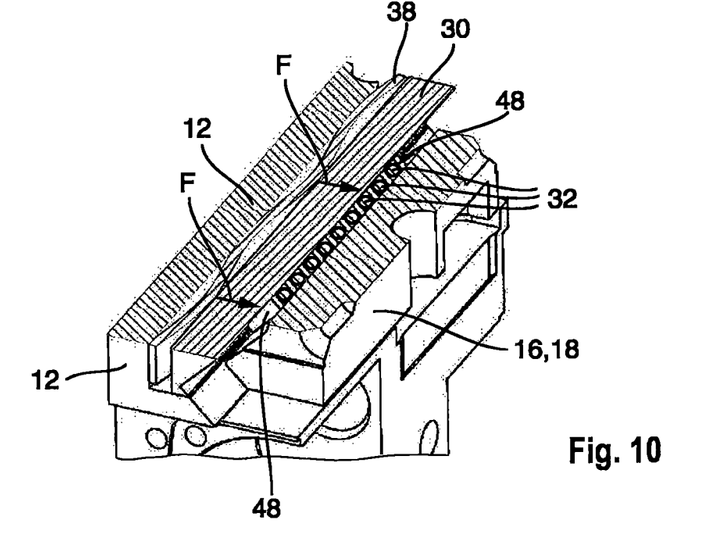
FIG. 10 shows a longitudinal section of the embodiment according to FIG. 9 along the plane X-X.

In the embodiment according to FIGS. 8 to 10, the pretensioning means 38 is designed as a wave spring which is provided between the housing body 12 and the relevant raceway part 30. In the section according to FIG. 10, it is also clear that the individual rolling elements 32 are trapped in a cage 48.

Figure 11:
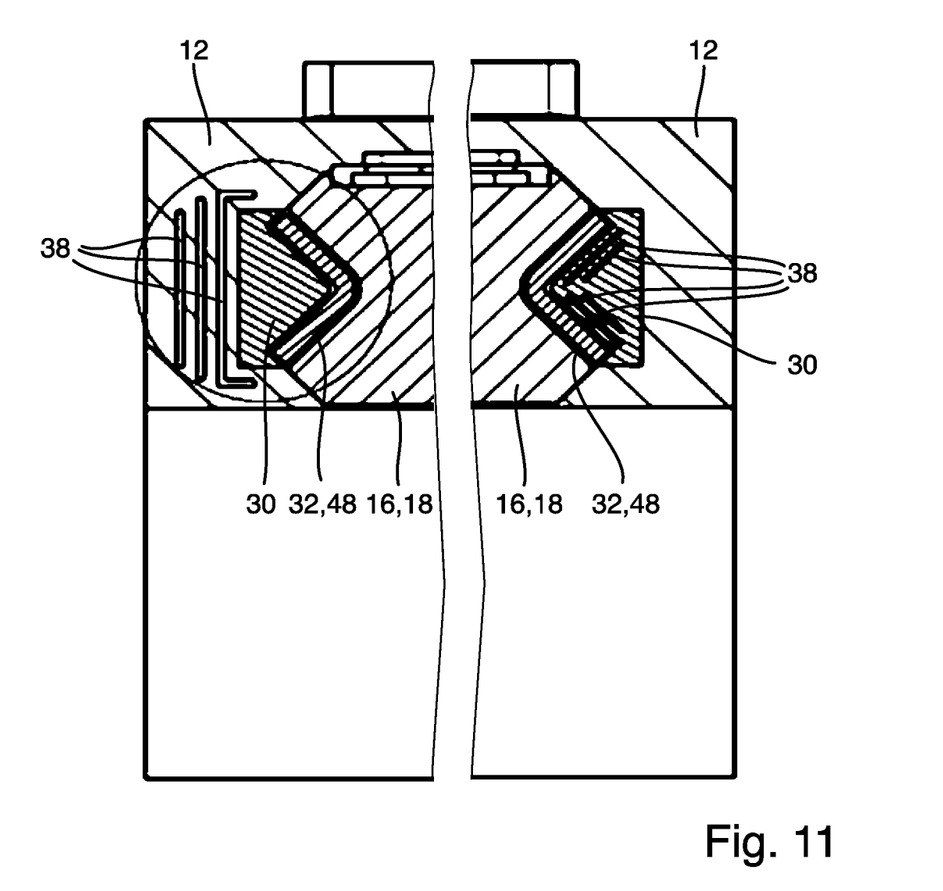
FIG. 11 shows cross sections of an additional gripping device according to the invention.

Two further embodiments of a gripping device according to the invention are shown in cross section in FIG. 11, in which components corresponding to components in the previous embodiments have corresponding reference signs. In the embodiment shown in the left-hand half of FIG. 11, pretensioning means 38 are provided as material recesses in the housing body 12. In the embodiment shown on the right-hand side in FIG. 11, the pretensioning means 38 are provided as material recesses in the raceway part 30. According to the invention, a combination of the embodiment shown in FIG. 11 is also conceivable, i.e. material recesses in the housing body 12 and also in the relevant raceway part 30.

Figure 12:
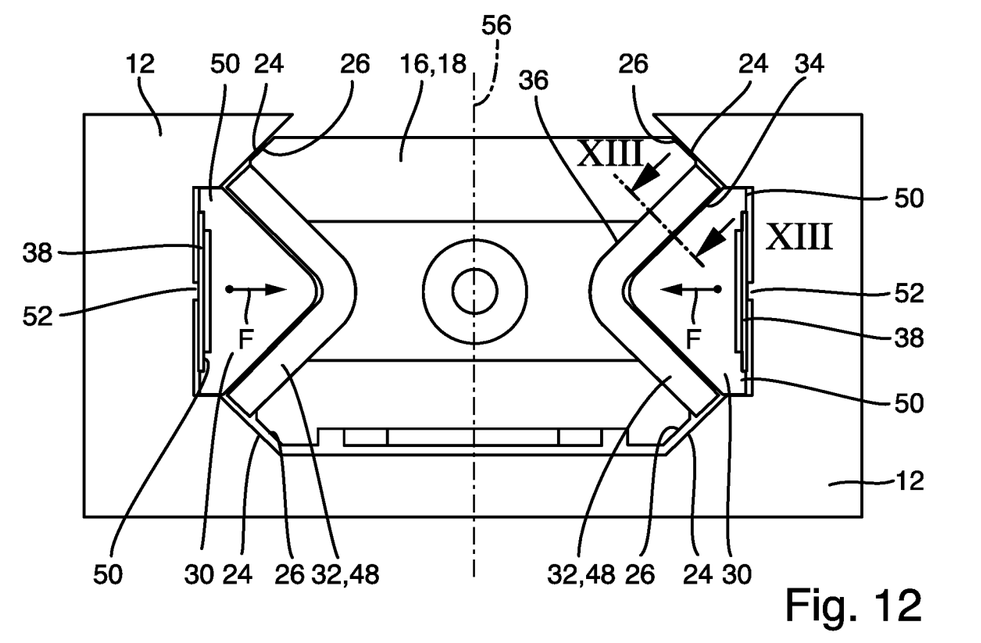
FIG. 12 shows a cross section of an additional gripping device according to the invention.
Figure 13:
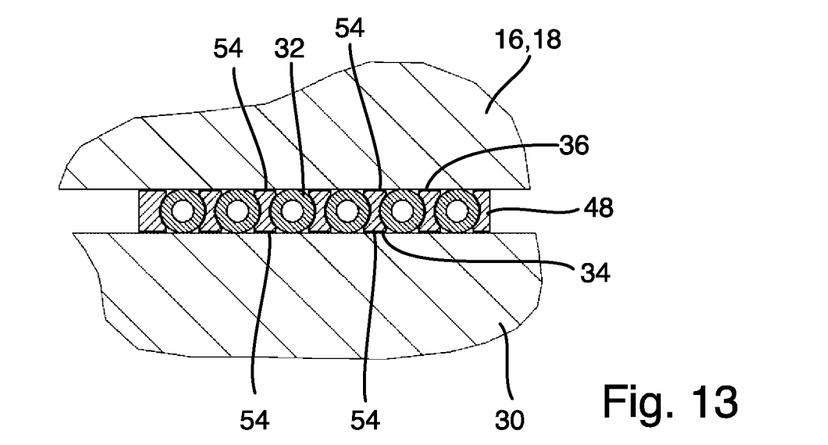
FIG. 13 shows a section along the line XIII in FIG. 12.

A further embodiment is shown in FIGS. 12 and 13, in which components corresponding to the other embodiments are identified with corresponding reference signs. In this embodiment, a pretensioning means 38 in the form of a spring plate is shown on the face of the raceway parts 30 that face the housing body 12. In the edge region, the spring plate interacts with contact portions 50 of the relevant raceway part 30. In the central region, a raised portion 52 on the housing body acts against the pretensioning means. The relevant pretensioning force F is provided by elastic deformation of the pretensioning means 38.

In the embodiment according to FIGS. 12 and 13, the rolling elements 32 are arranged in a cage 48. The cage 48 has sliding portions 54 which extend in parallel with the raceways 34, 36 and are shown in FIG. 13. The sliding portions 54, together with the raceways 34, 36, can be used as a sliding guide when a force, due to which the rolling elements are resiliently compressed in the radial direction, is exceeded. In the embodiment shown in FIG. 13, the rolling elements 32 can be designed as hollow rollers or hollow needles, as a result of which they are elastically compliant in the radial direction. The compliance can be selected in such a way that the pretensioning means 38 in the form of the spring plate, as shown in FIG. 12, can be omitted. The compliant hollow rollers or hollow needles then assume the function of the pretensioning means 38.

In the embodiment shown in FIGS. 12 and 13, the guide surfaces 24 and sliding surfaces 26, which interact directly with one another, can consequently be omitted and replaced with a sliding guide, which is formed by the cage 48 or by the sliding portions 54 of the sliding guide and the raceways 34, 36. By using the rolling element cage 48 to form the sliding guide, a very compact gripping or clamping device 10 can be provided overall.

Figure 14:
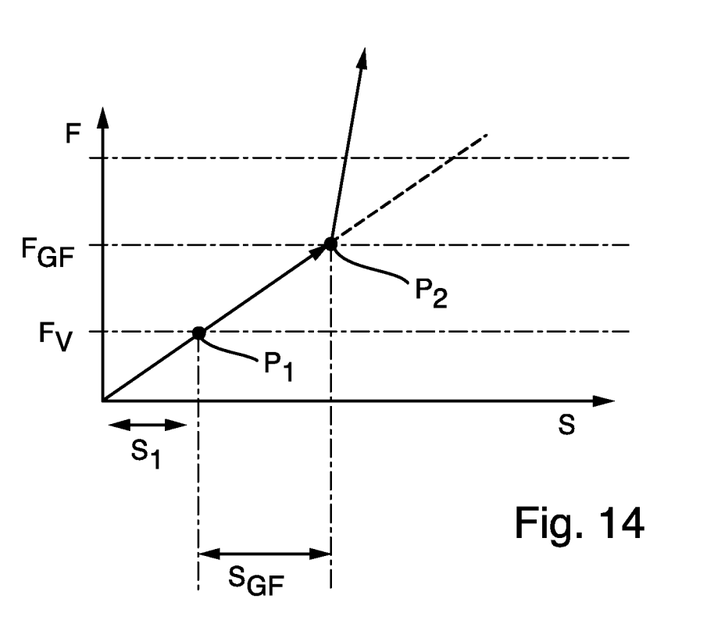
FIG. 14 is a force-distance diagram of a jaw of a gripping device according to the invention.

FIG. 14 shows the force F acting on a jaw 16, 18 transversely to the movement direction 26 by means of the spring travel s of the pretensioning means 38. At point $P_1$, the pretensioning force $F_V$ acts on the jaw 16, 18. The pretensioning means 38 is compressed by the spring travel $s_1$. If the external force F acting on the jaw 16, 18 increases from point $P_1$, the pretensioning means 38 is compressed further by the clearance of the sliding guide $s_{GF}$ until the force $F_{GF}$, at which the sliding guide comes into effect, is present at point $P_2$. If the force continues to increase at point $P_2$, this further increasing force is absorbed only by the sliding guide, which relieves the roller guide; there is then only minimal deformation due to the resilience of the materials used.

The invention claimed is:

1. A gripping or clamping device comprising a housing body and at least one jaw guide which is provided in the housing body and has two lateral walls, comprising at least one jaw which can be moved in the jaw guide along a movement direction, guide surfaces being provided on the lateral walls and the jaw having sliding surfaces which interact with the guide surfaces to form a sliding guide, characterized in that at least one raceway part and rolling elements are provided in the jaw guide, the jaw and the raceway part each having a raceway for abutting against the rolling elements to form a roller guide, and in that pretensioning means are provided for generating a pretensioning force, the pretensioning force acting on the raceway part such that the rolling elements are pressed against the jaw-side raceways.

2. The gripping or clamping device according to claim 1, wherein the sliding guide has a clearance between the guide surfaces and the sliding surfaces, such that the guide surfaces only act against the sliding surfaces if an external force which is counter to the direction of the pretensioning force and counteracts or exceeds the pretensioning force acts on the jaw.

3. The gripping or clamping device according to claim 1, comprising a raceway part is provided on each lateral wall, the raceway parts being arranged symmetrically with respect to one another and/or with respect to a central plane which extends in the movement direction.

4. The gripping or clamping device according to claim 1, wherein the raceway parts have raceways extending in parallel with one another.

5. The gripping or clamping device according to claim 1, wherein one raceway part has two raceways which include an angle ($\beta$, $\gamma$), and in that the jaw has sliding surfaces which extend correspondingly thereto.

6. The gripping or clamping device according to claim 1, comprising a plurality of guide surfaces are provided on each lateral wall, the planes in which adjacent guide surfaces are located including an acute angle ($\alpha$).

7. The gripping or clamping device according to claim 1, wherein the jaw has at least two sliding surfaces which interact with a lateral wall, and in that at least one jaw-side raceway is arranged between said sliding surfaces.

8. The gripping or clamping device according to claim 1, wherein the pretensioning means are integral with the raceway part and/or the housing body.

9. The gripping or clamping device according to claim 1, wherein the pretensioning means are designed as spring elements provided between the housing body and the raceway part.

10. The gripping or clamping device according claim 1, comprising adjusting means for adjusting the pretensioning force of the pretensioning means.

11. The gripping or clamping device according to claim 1, wherein the rolling elements are trapped in a cage, the cage having sliding portions which interact with the raceways.

12. The gripping or clamping device according to claim 1, wherein the rolling elements are designed as balls, barrels, rollers or needles.

\* \* \* \* \*